(12) United States Patent
Borean et al.

(10) Patent No.: US 7,753,029 B2
(45) Date of Patent: Jul. 13, 2010

(54) MULTI-CYLINDER INTERNAL COMBUSTION ENGINE WITH INDEPENDENT CYLINDERS

(75) Inventors: Fabio Borean, Orbassano (IT); Pasquale Ceres, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 12/326,351

(22) Filed: Dec. 2, 2008

(65) Prior Publication Data

US 2009/0150051 A1 Jun. 11, 2009

(30) Foreign Application Priority Data

Dec. 4, 2007 (EP) .................................. 07425773

(51) Int. Cl.
*F02M 1/00* (2006.01)
*F01L 1/00* (2006.01)

(52) U.S. Cl. .................... 123/434; 123/90.11; 123/322; 123/347

(58) Field of Classification Search .............. 123/198 F, 123/432, 90.12, 90.15, 90.16, 90.31, 90.48, 123/90.55, 434, 321, 322, 345–348, 90.11
See application file for complete search history.

(56) References Cited

U.S. PATENT DOCUMENTS

| 6,732,710 | B2 * | 5/2004 | Borean et al. ............... 123/432 |
| 6,736,092 | B2 * | 5/2004 | Borean et al. ............ 123/90.12 |
| 7,359,791 | B2 * | 4/2008 | Borean et al. ............... 701/103 |
| 2001/0023679 | A1 | 9/2001 | Ganser et al. |

FOREIGN PATENT DOCUMENTS

| DE | 100 01 062 | 10/2001 |
| DE | 101 06 169 | 8/2002 |
| EP | 0 931 912 | 7/1999 |
| WO | 02/073020 | 9/2002 |

* cited by examiner

*Primary Examiner*—John T Kwon
(74) *Attorney, Agent, or Firm*—Nixon & Vanderhye P.C.

(57) ABSTRACT

Internal combustion engine with variable actuation of the valves that provides electronic control means that considers the activation delays of the cylinders so that new operating conditions are assigned for the first time to a cylinder which firstly, following an engine operating variation request, is effectively able to satisfy such new operating conditions.

4 Claims, 4 Drawing Sheets

MULTI-CYLINDER INTERNAL COMBUSTION ENGINE WITH INDEPENDENT CYLINDERS

This application claims priority to European Application No. 07425773.4, filed 4 Dec. 2007, the entire contents of which are hereby incorporated by reference.

BACKGROUND OF THE INVENTION

The present invention relates to multi-cylinder internal combustion engines of the type comprising:
- an air delivery pipe adapted to convey air to each engine cylinder,
- at least one intake valve for each cylinder that controls the communication between said pipe and the combustion chamber of the respective cylinder, and
- wherein each intake valve is controlled by actuator means for making a determined quantity of air flow into said combustion chamber, said actuator means being susceptible to controlling the respective intake valve independently from the other cylinders and according to a variable actuation method,
- injector means for each cylinder adapted to carry out the injection of a determined quantity of fuel into said combustion chamber,
- electronic control means adapted to control:
    - said actuator means, for adjusting the opening time and stroke of the respective intake valve,
    - said injector means, for adjusting said determined quantity of fuel.

In conventional-type internal combustion engines, the adjustments of the operating conditions provide a variation of the fluid-dynamic conditions within said air delivery pipe. In particular, the throttle valve controls the fluid-dynamic conditions of the air in the said delivery pipe, making flows of greater or lesser fluid-dynamic load flow into the latter in such a way that the engine produces, correspondingly, a greater or lesser torque.

A particular transition time necessarily passes so that starting from the operation of the delivery pipe control system (generally the throttle valve) the fluid-dynamic conditions are reached corresponding to a new requested torque.

In order to provide for the influence of such transition time, and for the consequent delays that can be generated due to this, and, hence, to guarantee quick torque adjustments generated on the cylinders, conventional-type internal combustion engines carry out a control that provides to vary the spark advance compared to the optimal value. Such optimal spark advance value is generally recognised by a person skilled in the art as the spark advance value that guarantees improved combustion performance. This type of adaptation, hence, notably penalises the operating efficiency of the engine and, in any case, does not guarantee an "immediate" response of the engine to the considerably substantial variations in torque requested.

SUMMARY OF THE INVENTION

It is an object of the present invention to solve the above-mentioned drawbacks providing an engine of the type indicated above and also characterised in that it is arranged such that during operation the delivery pipe is maintained at a substantially constant pressure and that when the engine is requested to vary from a first mode of operation to a second mode, the above-mentioned electronic control means is adapted to carry out a control sequence in which:

- the quantities of air and fuel corresponding to said second operating mode are estimated;
- the actuation times required in said second operating mode of the engine are estimated, respectively for said injector means and said actuator means, based on the engine speed and said quantities of air and fuel previously estimated;
- based on said actuation times, the operating condition corresponding to said second operating mode of the engine is generated for the first time in the cylinder which first is susceptible to operate in said second condition following the moment when the calculation of said actuation times is carried out, and independently from the fact that said cylinder is that which enters the ignition phase first, following the variation request.

In a preferred embodiment of the engine according to the present invention, the electronic control means is adapted to carry out a control sequence in which:

- based on said actuation times, the time delay required for reaching in a cylinder the start of a combustion according to said operating condition is estimated, starting from the moment when the calculation of said actuation times is carried out,
- said operating condition is generated for the first time in the cylinder that, following the moment when the calculation of said times is carried out, is first susceptible to operate in the condition adapted for the start of such combustion, after said delay has passed.

In a further embodiment of the present invention, said electronic control means is adapted to carry out a control sequence in which:

- based on said actuation times, the time delay required for reaching top dead centre in one cylinder susceptible to carrying out the combustion corresponding to said operating condition is estimated, starting from the moment when the calculation of said times is carried out,
- the operating condition corresponding to said second operating mode of the engine is generated for the first time in the cylinder which first, following the moment when the calculation of said times is carried out, is susceptible to finding itself in a top dead centre condition destined for a combustion process, after such delay has passed.

A preferred embodiment of the combustion engine according to the present invention provides electronic control means to be arranged for estimating the above mentioned delay in a determined number of engine strokes such that said operating condition is generated for the first time in the cylinder which first, following the moment when the calculation of said times is carried out, is susceptible to finding itself in the above-mentioned top dead centre condition after the above-mentioned number of engine strokes has been carried out by the engine The internal combustion engine described here is able to respond immediately to the torque variation requests, guaranteeing an "almost instantaneous" modulation of the torque delivered. The air sucked into the cylinders, and likewise the quantity of fuel injected, can in fact be varied "step-by-step" within the range of an engine stroke, just as the air/petrol charge can also be adjusted according to a step-by-step method in all the required air and petrol ratios.

The present invention guarantees that such variation is carried out efficiently. In particular, in the engine according to the present invention, the above-indicated activation delays are considered so that the new operating conditions are assigned for the first time to the cylinder which firstly, following the engine operating variation request, is effectively able to satisfy such new operating conditions. In the engine according to the present invention, in line with a torque variation request, it is not, therefore, necessary to "lower" the spark advance values so that a constant optimal operating performance of the engine can be guaranteed.

BRIEF DESCRIPTION OF THE DRAWINGS

Further characteristics and advantages of the invention will be clear from the following description with reference to the attached drawings, provided by way of a non-limiting example, in which.

DETAILED DESCRIPTION OF THE INVENTION

The present invention refers to internal combustion engines that provide actuator means adapted to control the intake valve of each cylinder independently from the other cylinders and according to a variable actuation mode.

Figure 4:
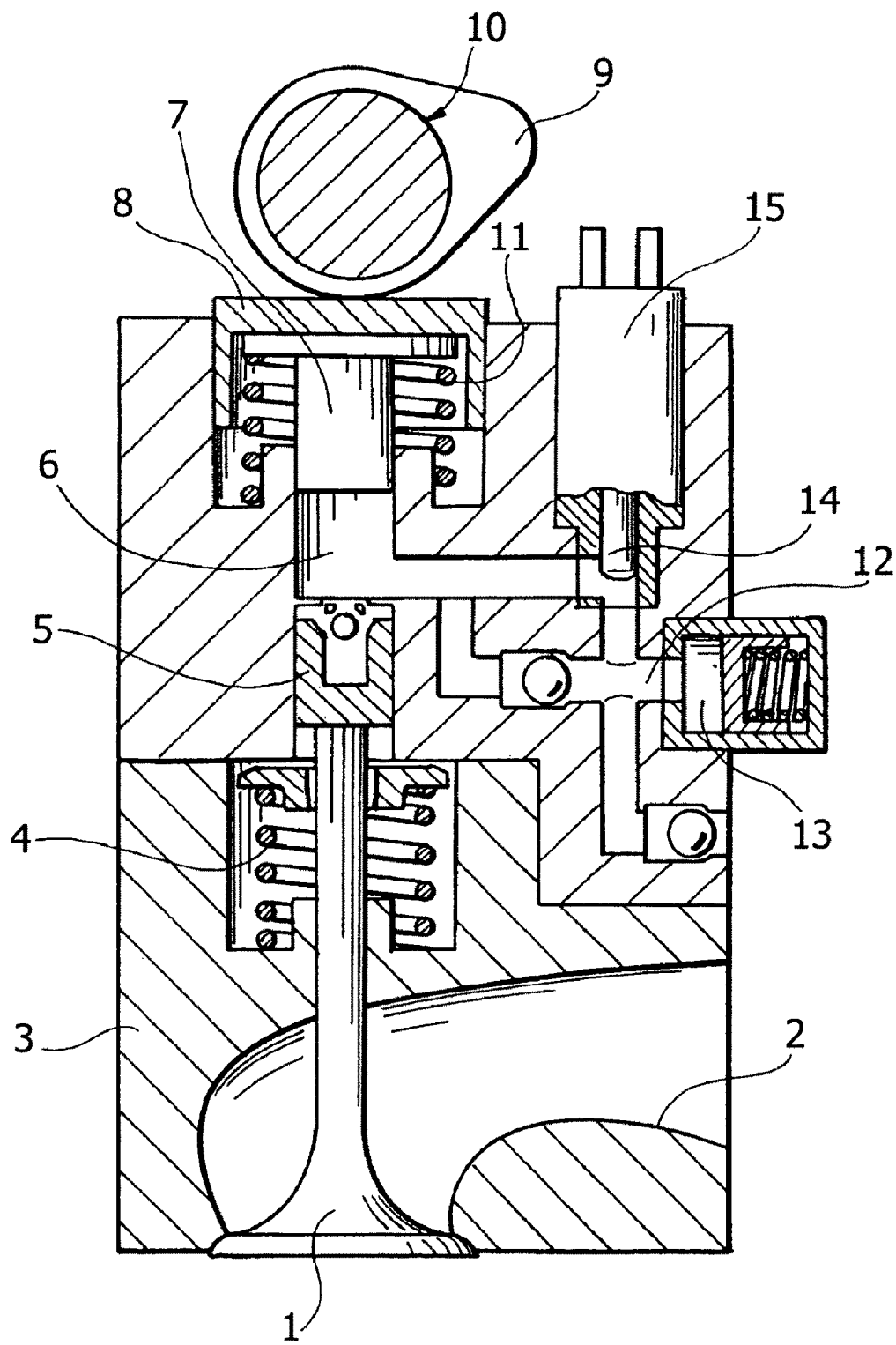
FIG. 4 is a schematic sectional view of an engine according to the known art, which illustrates the operating principle of a variable drive system of the engine valves.

An internal combustion engine of this type is, for example, represented by the internal combustion engines provided by the variable operating system of the valves which is schematically depicted in FIG. 4, and which is the subject matter of several patents by the same Applicant.

With reference to FIG. 4, the reference numeral 1 designates the valve as a whole (which can be either a intake valve or an exhaust valve) associated with a respective pipe 2 (suction or exhaust) formed in an internal combustion engine head 3. The valve 1 is returned towards its closed position (upwards with reference to FIG. 4) by a spring 4, whilst this is forced to open by a piston 5 acting on the upper end of the valve stem. The piston 5 is, in turn, controlled through pressure oil which is within a chamber 6 by a piston 7 that supports a bowl 8 cooperating with a cam 9 of a camshaft 10. The bowl 8 is held by a spring 11 in sliding contact with the cam 9. The pressure chamber 6 can be connected to a pipe 12 which, in turn, communicates with a pressure accumulator 13, through the shutter 14 of a solenoid valve 15 which is controlled by electronic control means (not illustrated) according to the engine operating conditions. When the solenoid valve 15 is opened, the pressure oil which is within the chamber 6 is discharged, hence the valve 1 closes quickly under the effect of the return spring 4. When the solenoid valve 15 is closed, the oil within the chamber 6 transmits the movements of the piston 7 to the piston 5 and consequently to the valve 1, hence the position of the valve 1 is determined by the cam 9. In other words, the cam 9 normally controls the opening of the valve 1 according to a cycle that depends on the cam profile, but it can be "disabled" whenever required, opening the solenoid valve 15, hence interrupting the connection between the piston 7 and the valve 1.

Hence, as disclosed above, by controlling the above-mentioned solenoid valve, which acts in order to adjust the opening time and stroke of the respective intake valve, it is possible for each cylinder to control the quantity of air sucked so that this is variable according to the required operating conditions for the cylinder and independently from the operating conditions of the other cylinders.

The internal combustion engine according to the present invention is, also, provided with injector means (not shown) for each cylinder, which are adapted to carry out the injection of a certain amount of fuel within the combustion chamber of the cylinder itself. Such injector means can be of any type commonly used in the technical field inherent here.

Electronic means are also provided for carrying out the above control of the solenoid valve, and, furthermore, for controlling the injector means in order to adjust the duration of fuel injection carried out within the combustion chamber of the cylinder and to adjust, therefore, the quantity of fuel introduced therein.

Figure 1:
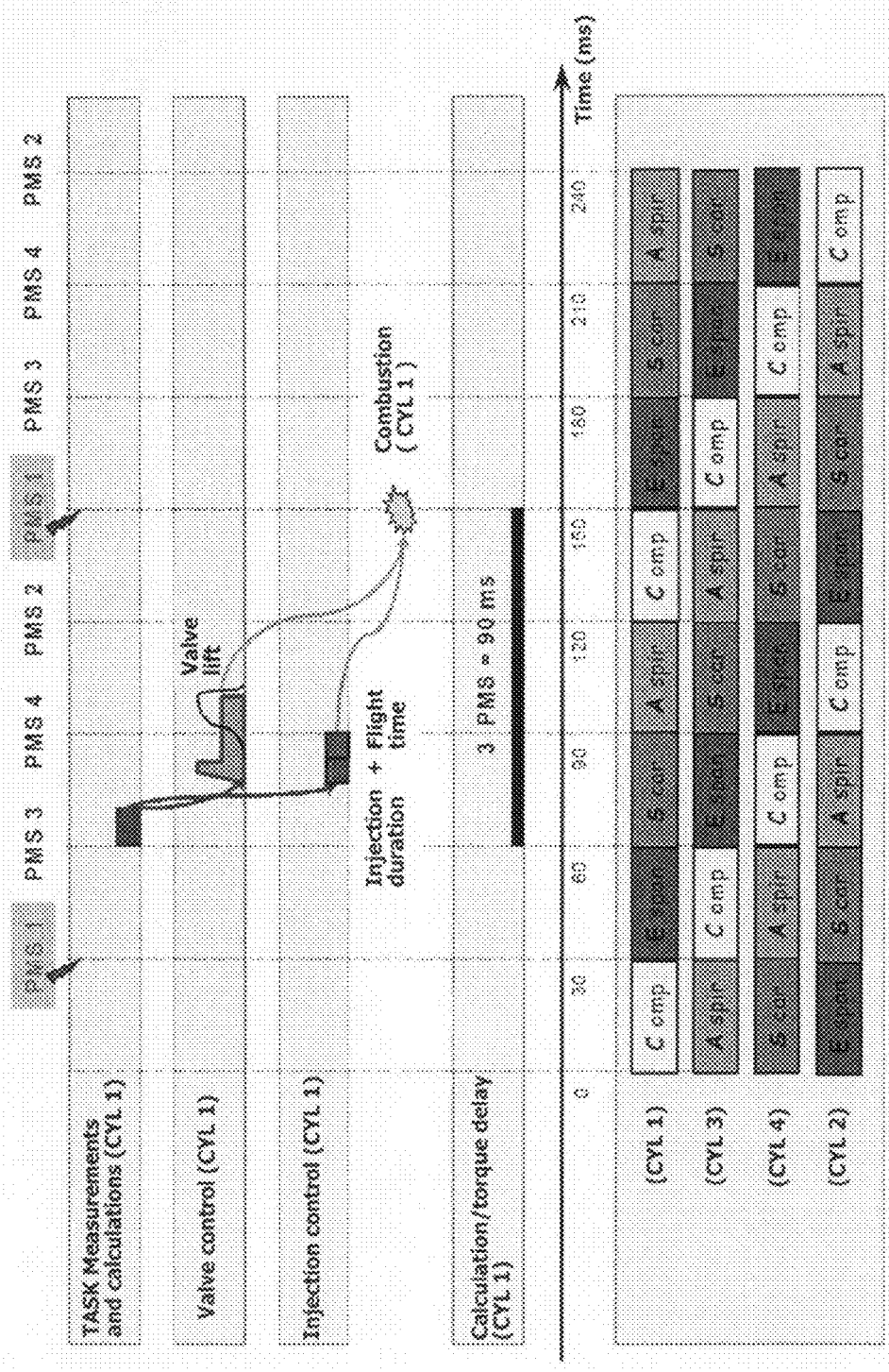
FIG. 1 represents an actuation diagram of an internal combustion engine cylinder in a first operating mode, at low speed.

FIG. 1 represents the dynamics, already widely known in the art, which take place for initiating the combustion process within a cylinder CYL1 of an internal combustion engine of the type here considered, provided with four cylinders and working at a rotation speed of 1000 rpm.

In particular, FIG. 1 presents a time axis that is subdivided into intervals all corresponding to an engine stroke Engine stroke, means herein the time that passes between the top dead centre condition in a cylinder and the immediately subsequent one in another engine cylinder. Furthermore, FIG. 1 indicates the actuation steps respectively of the electronic control means, the intake valve and the injection means of the cylinder being considered.

As can be seen in FIG. 1, between the request for a particular operating condition at the cylinder CYL1 corresponding to a given combustion process, and the triggering of said process in said cylinder, there is necessarily an activation delay due to the operating times for carrying out respectively the operations of the electronic control means, the actuations of the intake valve and the injector means, and so that the same cylinder reaches the determined ignition advance condition for the triggering of the above-mentioned combustion process.

Such activation delay can be advantageously processed as a number of engine strokes. Consequently, the operations of the electronic control means are articulated based on the successions of the engine strokes, whilst the combustion process in a cylinder is considered, not in reference to the triggering moment, but in reference to the top dead centre condition reached in such cylinder during such combustion.

In the specific example of FIG. 1, such activation delay, processed as above, is equal to about three engine strokes (corresponding to about 90 ms).

Figure 2:
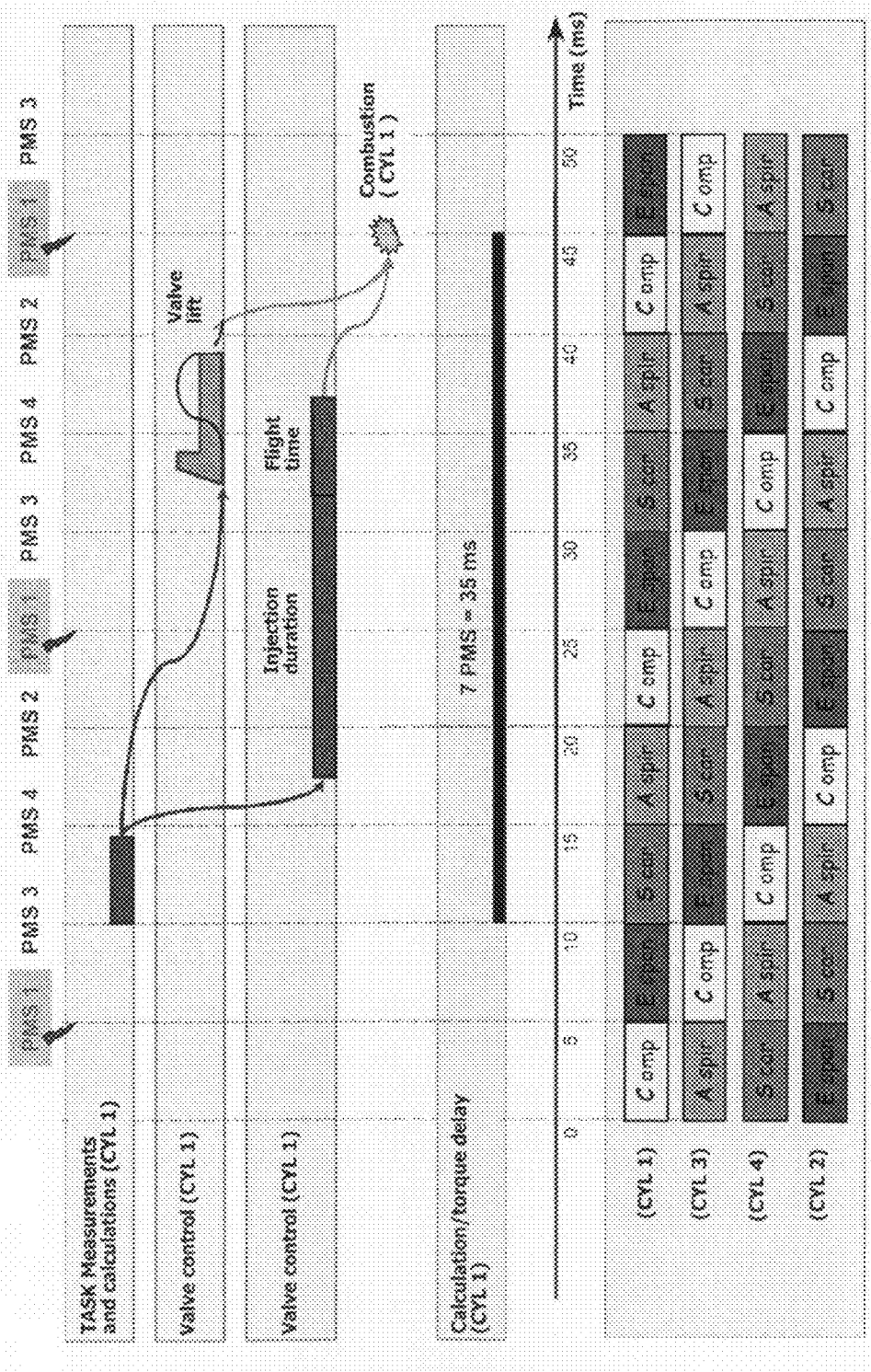
FIG. 2 represents an actuation diagram of the cylinder of FIG. 1 in a second operating mode, at high speed.

FIG. 2 represents a similar diagram to that in FIG. 1, wherein the engine provides in this case a rotation speed of 6000 rpm. The activation delay described above is, for this case, equal to seven engine strokes (corresponding to about 35 ms).

In order to be able to optimally exploit the fact that this engine is able to "momentaneously" adapt the torque delivered in the cylinders to the requested torque, the present invention provides for the above-mentioned electronic control means to be arranged for carrying out the control sequence described as follows.

The main aim of this control sequence is to adjust the first assignment to the cylinders of the new operating condition based on the activation delays corresponding to it, in order to guarantee that such operating condition is effectively carried out in the cylinder to which this is first assigned.

In order to describe this control sequence, reference will be made, as follows, to FIG. 3 which considers the case in which in an engine of the type described above a variation is carried out in the operating point (speed or load) between the top dead centre condition of the cylinder indicated (in brackets) with CYL 2 and the top dead centre condition of the cylinder indicated (still in brackets) with CYL1.

Figure 3:
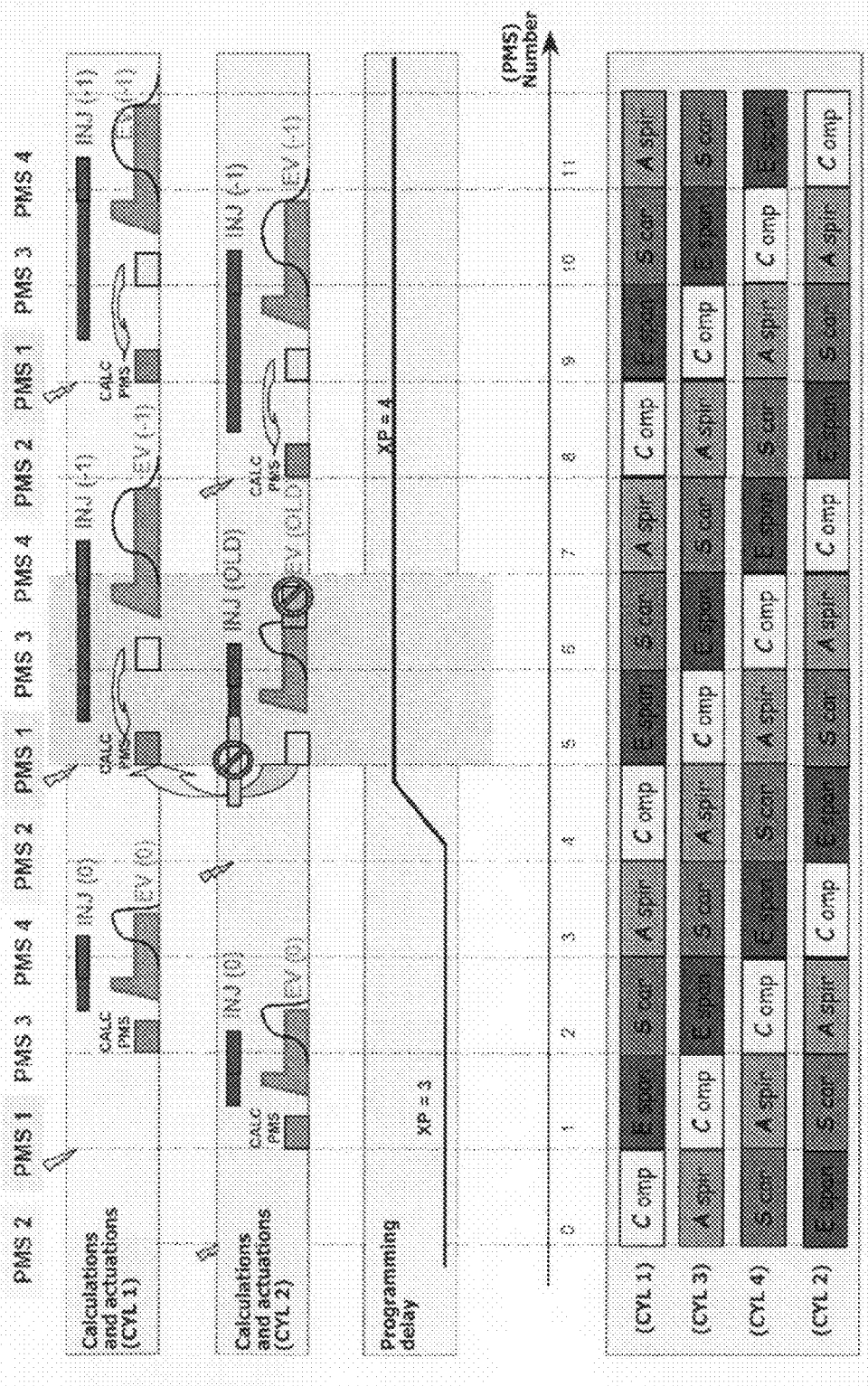
FIG. 3 represents an operating diagram of the internal combustion engine according to the present invention, in the presence of a (transient load or speed) variation of the engine conditions which causes an increase in said actuation times.

As can be seen in FIG. 3, the activation delay of the operating conditions of the cylinders, before the request to increase the torque, is equal to three engine strokes.

A first step of such sequence provides for the electronic control means to calculate the actuation times, respectively of the intake valve, and the injector means, necessary for establishing the new operating condition in the cylinders.

The electronic control means, hence, carry out an estimate, based on the above-mentioned actuation times, of the activation delay of the cylinders corresponding to the engine operating mode. As previously mentioned, such delay corresponds to the range that passes between the request to carry out the engine operation (which is considered by the electronic control means in line with the immediately subsequent top dead centre condition) and the achievement for a cylinder operating according to the operating mode in vigour, of the first top dead centre condition for the effective implementation of the combustion process corresponding to the new engine operating conditions. This delay is estimated as a number of engine strokes.

This delay, as indicated above, is due to the necessary time to carry out the operations of the electronic control means, the actuations of the intake valve and of the injector means, and so that the same cylinder reaches the optimal advance ignition condition for the triggering of the combustion process of the new operating condition.

Once such delay has been calculated, the electronic control means is adapted to assign the new operating conditions (corresponding to the new air/petrol load) for the first time to the cylinder that was first, after the moment of said variation, susceptible to finding itself in a top dead centre condition for the implementation of a combustion process, after the calculated delay has passed, that is following the engine strokes constituting such delay.

In FIG. 3, the actuation diagrams of the respective injector means and the respective intake valve are shown for both the cylinders CyL1 and CYL2, as also for the electronic control means, for an operating period identified by the time axis.

In line with the first engine operating mode (previous to the variations in actuation times on the time axis) both the cylinders operate in the same operating condition which assumes the actuation modes indicated in the figure as INJ(0) and EV(0), respectively of the injector means and the intake valve.

In line with the actuation time variation, the electronic means evaluates the times necessary for the actuation operations of the intake valve and the injector means, adapted for establishing the combustion process that can generate the new requested torque.

The electronic control means, hence, calculates the activation delay corresponding to the new operating conditions of the cylinders and based on this it evaluates to which cylinder to assign the operating condition corresponding to the new conditions.

The activation delay corresponding to the new operating condition of the example in FIG. 3 is equal to 4 engine strokes.

As has been schematically represented in FIG. 3, for cylinder 2 it is not possible to carry out the above-mentioned combustion process adapted to generate the requested torque in line with its top dead centre condition which is destined to be developed in a combustion process, and is immediately subsequent to the variation in actuation times. In fact, from FIG. 3, it can be understood that starting from the moment of such variation, only three engine strokes follow before reaching such top dead centre condition of cylinder CYL2, whilst the activation delay of the new operating conditions is equal to four engine strokes.

The time available, starting from the moment of the actuation time variation, in order to reach the top dead centre condition in cylinder CYL2 destined to be developed in a combustion process is, hence, insufficient to actuate in synchrony the injector means and the intake valve of that cylinder in order to establish the new operating conditions.

In other words, as schematically indicated in FIG. 2 the actuations, and specifically the actuation stage of the injector means, adapted to establish a combustion process able to generate the requested torque, should have started before the torque request time. This condition is schematically represented in FIG. 3 by the part relative to the actuation of the injector means of the cylinder CYL2 which is indicated as eliminated by a prohibition sign.

It emerges, hence, that it is in particular the necessary time for the new injection operations that determines the unsuitability of cylinder CYL2 to be the first cylinder to operate according to the new operating conditions.

Whereas, it emerges that the cylinder CYL1, on the other hand, is the first cylinder susceptible to operating according to the new operating conditions. In fact, starting from the moment of the variation in actuation times until the top dead centre condition of the cylinder CYL1 destined for a combustion process, four engine strokes follow each other, which correspond exactly to the necessary time for carrying out the new operating conditions.

Following the evaluations described above, the electronic control means assigns to the injector means and the actuator means of the intake valve of the cylinder CYL1, the actuation modes corresponding to the new operating conditions. In FIG. 3, these new actuation modes are respectively indicated as INJ(−1) and EV(−1). The arrow represented in FIG. 3 which is laid out transversally indicates the fact that once the electronic means has verified that the CYL2 is not susceptible to being the first cylinder to operate in the new operating conditions, it automatically assigns to the new actuator means and the injector means of the cylinder CYL1 such new actuation modes.

The actuation modes of the injection means and the actuator means of the intake valve of the cylinder CYL2, and hence the operating conditions of the latter, are controlled in such a way that they continue to be the same as those preceding the torque increase request. Such actuation modes are respectively indicated in brackets by INJ(OLD) and EV(OLD) and are the same as the modes INJ(0) and EV(0) previously defined.

Following the last cycle carried out by the cylinder CYL2 in the old operating conditions (with the actuation modes INJ(OLD) and EV(OLD)), the electronic means finally assigns to the latter the operation with the new operating condition for which the actuation modes associated with this are the modes INV(−1) and EV(−1)).

Since the activation delay of the new operating conditions is increased by an engine stroke compared to the previous activation delay, the electronic means starts to operate the control for the implementation of the new operating conditions on the various cylinders one stroke before the stroke in which the electronic means intervened in the old operating conditions. Such intervention variation is indicated schematically in FIG. 3 using horizontal arrows, for both the cylinders CYL1 and CYL2, in line with the steps in which they operate in the new operating conditions.

FIG. 3 illustrates an example in which the new operating conditions of the cylinders cause an increase in the activation delay which, in the specific case of the example, passes from a value equal to three engine strokes to a value equal to four engine strokes. In this case, within an engine stroke two respective programmings are carried out on two distinctive cylinders by the electronic control means; the first of those cylinders (which in the case of FIG. 3 is the cylinder CYL2) is represented by the cylinder which is not able to operate already in the new operating conditions and to which the old conditions are therefore assigned, whereas the second cylinder (which in the case of FIG. 3 is the cylinder CYL1) is represented, with regard to the above, by the first "useful" cylinder to which the new operating conditions are assigned.

Whereas, in the opposite case in which the activation delay corresponding to the new operating conditions requested, is lower than that of the old conditions, the same cylinder to which the old operating conditions were previously assigned is reprogrammed by the electronic control means so that it can operate according to the new conditions immediately.

Naturally, various modifications to the construction details and the embodiments can be possible, within the spirit of the invention according to that described and disclosed merely by way of example, without departing from the scope of the present invention.

What is claimed is:

1. A multi-cylinder internal combustion engine comprising:
    an air delivery pipe adapted to convey air to each engine cylinder,
    at least one intake valve for each cylinder that controls the communication between said pipe and the combustion chamber of the respective cylinder,
    wherein each intake valve is controlled by actuator means for feeding a determined quantity of air into said combustion chamber, said actuator means being adapted to control the respective intake valve independently from the other cylinders and according to variable actuation modes, wherein
    said actuator means comprises:
    return spring means (4) which pushes the valve (1) towards a closed position, to control the communication between the respective suction pipe (2) and the combustion chamber of the respective cylinder,
    at least one camshaft (10) to drive each intake valve (1) of the cylinders (20) of the engine through respective valve lifters (7), each intake valve (1) being controlled by a respective cam (9) of said camshaft (10),
    wherein each of said valve lifters (7) controls the respective intake valve (1) against the action of said return spring means (4) through the interposition of hydraulic means including a pressure fluid chamber (6),
    the pressure fluid chamber (6) associated with each intake valve (1) being adapted to be connected using a solenoid valve (15) to a discharge channel (12) in order to uncouple the valve (1) from the respective valve lifter (7) and causing the rapid closure of the valve (1) due to the respective return spring means (4),
    said engine also comprising:
    injector means for each cylinder adapted to carry out the injection of a determined quantity of fuel into said combustion chamber,
    electronic control means of the operating conditions of the cylinders adapted to control:
        said actuator means, for adjusting the opening time and stroke of the respective intake valve,
        said injector means, for adjusting said determined quantity of fuel,
    said engine being arranged such that during operation the delivery pipe is maintained at a substantially constant pressure and that when the engine is requested to vary from a first mode of operation to a second mode, the above-mentioned electronic control means is adapted to carry out a control sequence in which:
        the quantities of air and fuel corresponding to said second operating mode are estimated;
        the actuation times required in said second operating mode of the engine are estimated, respectively for said injector means and said actuator means, based on the engine speed and said quantities of air and fuel previously estimated;
        based on said actuation times, the time delay required for reaching top dead centre in one cylinder susceptible to carrying out the combustion corresponding to said second operating mode is estimated, starting from the moment when the calculation of said times is carried out,
        the actuation modes of said injector means and said actuator means corresponding to the second operating mode are assigned for the first time in the cylinder which first, following the moment when the calculation of said times is carried out, is susceptible to finding itself in a top dead centre condition destined for a combustion process, after such delay has passed,
        the actuation modes of said injector means and said actuator means corresponding to the first mode of operation are assigned to the cylinders that, following the moment when the calculation of said times is carried out, are susceptible to finding themselves in a top dead centre condition destined for a combustion process, before such delay has passed.

2. An engine according to claim 1, wherein said electronic means is adapted to estimate said delay as a number of engine strokes.

3. An operating method of a multi-cylinder internal combustion engine of the type comprising:
    an air delivery pipe adapted to convey air to each engine cylinder,
    at least one intake valve for each cylinder that controls the communication between said pipe and the combustion chamber of the respective cylinder,
    wherein each intake valve is controlled by actuator means for making a determined quantity of air flow into said combustion chamber, said actuator means being susceptible to controlling the respective intake valve independently from the other cylinders and according to variable actuation modes,
    wherein said actuator means comprises:
    return spring means (4) which pushes the valve (1) towards a closed position, to control the communication between the respective suction pipe (2) and the combustion chamber of the respective cylinder,
    at least one camshaft (10) to drive each intake valve (1) of the cylinders (20) of the engine through respective valve lifters (7), each intake valve (1) being controlled by a respective cam (9) of said camshaft (10),
    wherein each of said valve lifters (7) controls the respective intake valve (1) against the action of said return spring means (4) through the interposition of hydraulic means including a pressure fluid chamber (6),
    the pressure fluid chamber (6) associated with each intake valve (1) being adapted to be connected using a solenoid valve (15) to a discharge channel (12) in order to uncouple the valve (1) from the respective valve lifter (7) and causing the rapid closure of the valve (1) due to the respective return spring means (4), said engine also comprising:

injector means for each cylinder adapted to carry out the injection of a determined quantity of fuel into said combustion chamber, electronic control means of the operating conditions of the cylinders adapted to control:

said actuator means, for adjusting the opening time and stroke of the respective intake valve, said injector means, for adjusting said particular quantity of fuel, said method providing to maintain the delivery pipe at a substantially constant pressure, and when said engine is subject to an operating variation request from a first mode to a second mode, said method providing to carry out a control sequence in which:

the quantities of air and fuel corresponding to said second operating mode are estimated;

the actuation times required in said second operating mode of the engine are estimated, respectively for said injector means and said actuator means, based on the engine speed and said quantities of air and fuel previously estimated;

based on said actuation times, the time delay required for reaching top dead centre in one cylinder susceptible to carrying out the combustion corresponding to said second operating mode is estimated, starting from the moment when the calculation of said times is carried out;

the actuation modes of said injector means and said actuator means corresponding to the second operating mode are assigned for the first time in the cylinder which first, following the moment when the calculation of said times is carried out, is susceptible to finding itself in a top dead centre condition destined for a combustion process, after such delay has passed;

the actuation modes of said injector means and said actuator means corresponding to the first mode of operation are assigned to the cylinders that, following the moment when the calculation of said times is carried out, are susceptible to finding themselves in a top dead centre condition destined for a combustion process, before such delay has passed.

4. A method according to claim 3, wherein the method provides to estimate said delay as a number of engine strokes.

* * * * *